US012318789B2

(12) United States Patent
Tomac

(10) Patent No.: US 12,318,789 B2
(45) Date of Patent: Jun. 3, 2025

(54) SWEEPING JET DEVICE WITH MULTIDIRECTIONAL OUTPUT

(71) Applicant: Ohio State Innovation Foundation, Columbus, OH (US)

(72) Inventor: Mehmet Tomac, Worthington, OH (US)

(73) Assignee: Ohio State Innovation Foundation, Columbus, OH (US)

(*) Notice: Subject to any disclaimer, the term of this patent is extended or adjusted under 35 U.S.C. 154(b) by 356 days.

(21) Appl. No.: 17/776,908

(22) PCT Filed: Nov. 14, 2019

(86) PCT No.: PCT/US2019/061505
§ 371 (c)(1),
(2) Date: May 13, 2022

(87) PCT Pub. No.: WO2021/096515
PCT Pub. Date: May 20, 2021

(65) Prior Publication Data

US 2022/0410182 A1 Dec. 29, 2022

(51) Int. Cl.
*B05B 1/08* (2006.01)

(52) U.S. Cl.
CPC .................................... *B05B 1/08* (2013.01)

(58) Field of Classification Search
CPC ......... B05B 1/08; B05B 1/14; B05B 17/0692; Y10T 137/2185; B60S 1/52; F15B 21/12; F15C 1/22
See application file for complete search history.

(56) References Cited

U.S. PATENT DOCUMENTS

| | | | |
|---|---|---|---|
| 2,916,873 | A | 12/1959 | Walker |
| 2,943,821 | A | 7/1960 | Wetherbee |

(Continued)

FOREIGN PATENT DOCUMENTS

| | | |
|---|---|---|
| CA | 2711711 | 2/2012 |
| DE | 102017206849 | 10/2018 |

(Continued)

OTHER PUBLICATIONS

Culley, Dennis. "Variable frequency diverter actuation for flow control." 3rd AIAA Flow Control Conference. Jun. 5-8, 2006. San Francisco, CA. 12 pages.

(Continued)

*Primary Examiner* — Qingzhang Zhou
*Assistant Examiner* — Joel Zhou
(74) *Attorney, Agent, or Firm* — Meunier Carlin & Curfman LLC

(57) ABSTRACT

Various implementations include a sweeping jet device with multidirectional output. The device includes an interaction chamber defined by a chamber wall. The chamber wall defines first and second inlet ports and first and second outlet ports. First and second fluid supply inlets are configured to introduce first and second inlet fluid streams through the first and second inlet ports, respectively, and into the interaction chamber. First and second outlet nozzles are configured to discharge first and second outlet fluid streams from the interaction chamber through the first and second outlet ports and the first and second outlet nozzles, respectively. The first and second inlet fluid streams collide within the interaction chamber causing the first and second outlet fluid streams to sweep as the first and second outlet fluid streams are discharged from the first and second outlet nozzles, respectively.

20 Claims, 7 Drawing Sheets

(56) References Cited

U.S. PATENT DOCUMENTS

| | | | |
|---|---|---|---|
| 3,117,593 A | 1/1964 | Sowers, III | |
| 3,204,405 A | 9/1965 | Warren et al. | |
| 3,212,259 A | 10/1965 | Edward | |
| 3,228,410 A | 1/1966 | Warren | |
| 3,266,510 A | 8/1966 | Wadey | |
| 3,427,809 A | 2/1969 | Lavoie | |
| 3,448,752 A | 6/1969 | O'Neill | |
| 3,552,415 A | 1/1971 | Small | |
| 3,605,778 A | 9/1971 | Metzger | |
| 3,614,964 A | 10/1971 | Chen | |
| 3,749,317 A | 7/1973 | Osofsky | |
| 4,122,845 A | 10/1978 | Stouffer | |
| 4,463,904 A | 8/1984 | Bray, Jr. | |
| 4,508,267 A | 4/1985 | Stouffer | |
| 4,596,364 A | 6/1986 | Bauer | |
| 4,955,547 A | 9/1990 | Woods | |
| 5,524,660 A | 6/1996 | Dugan | |
| 5,827,976 A | 10/1998 | Stouffer et al. | |
| 5,845,845 A | 12/1998 | Merke et al. | |
| 5,876,182 A | 3/1999 | Schulte | |
| 6,253,782 B1 | 7/2001 | Raghu | |
| 6,497,375 B1 | 12/2002 | Srinath et al. | |
| 7,036,749 B1 | 5/2006 | Steerman | |
| 7,128,082 B1 | 10/2006 | Cerretelli et al. | |
| 7,775,456 B2 | 8/2010 | Gopalan et al. | |
| 8,297,540 B1 | 10/2012 | Vijay | |
| 8,382,043 B1 | 2/2013 | Raghu | |
| 8,869,320 B1 | 10/2014 | Santamarina et al. | |
| 9,333,517 B2 | 5/2016 | Koklu | |
| 9,339,825 B2 | 5/2016 | Koklu | |
| 9,802,209 B2 | 10/2017 | Koklu | |
| 10,429,138 B2 | 10/2019 | Gissen et al. | |
| 2005/0087633 A1 | 4/2005 | Gopalan | |
| 2006/0157596 A1 | 7/2006 | Tippetts | |
| 2007/0063076 A1 | 3/2007 | Gopalan | |
| 2008/0149205 A1 | 6/2008 | Gupta et al. | |
| 2010/0123031 A1 | 5/2010 | Weber | |
| 2012/0175438 A1 | 7/2012 | Ji et al. | |
| 2013/0048274 A1 | 2/2013 | Schultz et al. | |
| 2014/0103134 A1 | 4/2014 | Raghu | |
| 2016/0030954 A1 | 2/2016 | Gopalan et al. | |
| 2016/0052621 A1 | 2/2016 | Ireland et al. | |
| 2016/0243562 A1 | 8/2016 | Koklu | |
| 2016/0318602 A1 | 11/2016 | Whalen et al. | |
| 2017/0216852 A1* | 8/2017 | Gopalan | B05B 1/08 |
| 2017/0326560 A1 | 11/2017 | Kanda | |
| 2018/0281930 A1 | 10/2018 | Koklu et al. | |
| 2018/0370617 A1 | 12/2018 | Raghu | |
| 2019/0145441 A1 | 5/2019 | Tomac et al. | |
| 2020/0038884 A1 | 2/2020 | Wintering et al. | |
| 2020/0306771 A1 | 10/2020 | Tomac et al. | |
| 2020/0376503 A1 | 12/2020 | Wintering et al. | |

FOREIGN PATENT DOCUMENTS

| | | |
|---|---|---|
| EP | 2554854 | 2/2013 |
| EP | 2708426 | 3/2014 |
| JP | 2005-247187 A | 9/2005 |
| JP | 2013-001246 A | 1/2013 |
| WO | 80/00927 | 5/1980 |
| WO | 2007/149436 | 12/2007 |
| WO | 2008/135967 A1 | 11/2008 |
| WO | 2016/025858 A1 | 2/2016 |
| WO | 2016/161349 | 10/2016 |
| WO | 2017/194525 | 11/2017 |
| WO | 2018/197231 | 11/2018 |
| WO | 2019/108628 | 6/2019 |
| WO | 2020/243274 | 12/2020 |
| WO | 2021/096516 | 5/2021 |
| WO | 2021/145905 | 7/2021 |

OTHER PUBLICATIONS

Deere, Karen et al. "A Computational Study of a Dual Throat Fluidic Thrust Vectoring Nozzle Concept." 41st AIAA/ASME/SAE/ASEE Joint Propulsion Conference & Exhibit. 2005. 16 pages.

Deere, Karen. "Summary of fluidic thrust vectoring research at NASA Langley Research Center." 21st AIAA applied aerodynamics conference. Jun. 23-26, 2003. Orlando, FL. 18 pages.

Gokoglu, S. A., Kuczmarski, M. A., Culley, D. E., and Raghu, S., 2011, "Numerical studies of an array of fluidic diverter actuators for flow control," AIAA-2011-3100, Proceedings of the 41st AIAA Fluid Dynamics Conference and Exhibit, Honolulu, HI.

Gregory, James W. et al. "Variable-frequency fluidic oscillator driven by a piezoelectric bender." AIAA journal 47.11 (2009): 2717-2725.

European Patent Office. Extended European Search Report, issued in European Application No. 18883610.0 on Jul. 16, 2021. 8 pages.

International Search Report and Written Opinion issued by the International Searching Authority (ISA/EP) in PCT Application No. PCT/US2019/061506 on Aug. 24, 2020. 16 pages.

International Search Report and Written Opinion issued by the International Searching Authority (ISA/US) in PCT Application No. No. PCT/US2020/034882 on Nov. 17, 2020. 12 pages.

International Search Report and Written Opinion issued by the International Searching Authority (ISA/EP) in PCT Application No. PCT/US2020/017249 on Feb. 12, 2021. 23 pages.

International Search Report and Written Opinion issued by the International Searching Authority (ISA/US) in PCT Application No. PCT/US2018/062812 on Feb. 21, 2019. 10 pages.

Invitation to Pay Additional Fees and Communication Relating to the Results of the Partial International Search, issued by the International Searching Authority (ISA/EP) in PCT Application No. PCT/US2020/017249 on Dec. 10, 2020. 16 pages.

Shigeta, M., Miura, T., Izawa, S., and Fukunishi, Y., 2009, "Active Control of Cavity Noise by Fluidic Oscillators," Theoretical and Applied Mechanics Japan, vol. 57, pp. 127-134.

Tesař, V., Zhong, S., and Rasheed, F., 2013, "New Fluidic-Oscillator Concept for Flow-Separation Control," AIAA Journal, vol. 51, No. 2, pp. 397-405.

Tomac, Mehmet N. "Effect of Geometry Modifications on the Vectoring Performance of a Controlled Jet." Journal of Applied Fluid Mechanics, 10 (1), 2017. 9 pages.

U.S. Patent & Trademark Office. Non-Final Office Action. U.S. Appl. No. 16/767,847, filed Nov. 17, 2022. 8 pages.

U.S. Patent & Trademark Office. Restriction Requirement. U.S. Appl. No. 16/767,847, filed Sep. 22, 2022. 6 pages.

European Patent Office. Communication under Rule 71(3). Issued in European Application No. 19817513.5 on Mar. 27, 2023. 63 pages.

U.S. Patent & Trademark Office. Non-Final Office Action. U.S. Appl. No. 17/614,135, filed Mar. 17, 2023. 45 pages.

U.S. Patent & Trademark Office. Final Office Action. U.S. Appl. No. 16/767,847, filed May 12, 2023. 14 pages.

U.S. Patent & Trademark Office. Notice of Allowance. U.S. Appl. No. 17/614,135, filed Aug. 21, 2023. 16 pages.

Japanese Patent Office. Office Action issued in JP Application No. 2022-528052 on Aug. 16, 2023. 5 pages, including English translation.

U.S. Patent & Trademark Office. Office Action. U.S. Appl. No. 16/767,847, filed Aug. 29, 2023. 10 pages.

European Patent Office. Communication under Rule 71(3). Issued in European Application No. 18883610.0 on May 16, 2023. 8 pages.

European Patent Office. Extended European Search Report, issued in European Application No. 20813670.5 on May 22, 2023. 9 pages.

European Patent Office. Extended European Search Report. Issued in EP Application No. 23192325.1 on Jul. 9, 2024. 8 pages.

European Patent Office. Extended European Search Report. Issued in EP Application No. 24161081.5 on Jun. 19, 2024. 9 pages.

Japanese Patent Office. Office Action issued in JP Application No. 2022-528015 on Nov. 7, 2023. 4 pages, including English translation.

European Patent Office. Communication under Rule 71(3) EPC issued in European Application No. 18883610.0 on Oct. 9, 2023. 8 pages.

(56) References Cited

OTHER PUBLICATIONS

International Searching Authority (ISA/EP). International Search Report and Written Opinion, issued in PCT Application No. PCT/US2019/061505 on Aug. 3, 2020. 12 pages.

* cited by examiner

SWEEPING JET DEVICE WITH MULTIDIRECTIONAL OUTPUT

CROSS-REFERENCE TO RELATED APPLICATIONS

This application is a national stage application filed under 35 U.S.C. § 371 of PCT/US2019/061505 filed Nov. 14, 2019, which is fully incorporated by reference and made a part hereof.

BACKGROUND

Jet interaction-type fluidic oscillators create an unsteady sweeping jet. The sweeping pattern of the jet depends primarily on the internal fluid dynamics of the oscillator itself. Fluidic oscillators are attracting increased interest to be used in various applications since they have no moving parts, yet they offer high control authority, sweeping over a wide range, and, due to their unique fluid distribution system, larger sweeping area capabilities for the same amount of fluid.

Currently, jet interaction-type fluidic oscillators include two fluid inputs and a single fluid output. In various applications, it may be desired to have fluid output from the device in multiple directions, requiring orientation of multiple jet interaction-type fluidic oscillators such that the fluid exiting the oscillators cover a multidirectional field. However, including multiple jet interaction-type fluidic oscillators in close proximity to each other may become cumbersome. Furthermore, in some applications it may be desired that the fluid output of each of the jet interaction-type fluidic oscillators be in communication with each other. However, if multiple jet interaction-type fluidic oscillators are used, each jet interaction-type fluidic oscillator will oscillate independently from the other jet interaction-type fluidic oscillators.

Thus, there is a desire for a jet interaction-type device capable of creating multidirectional sweeping outputs that are in communication with each other.

SUMMARY

Various implementations include a sweeping jet device with multidirectional output. The device includes a first portion, a second portion, and a middle portion having a first side and a second side. The first side of the middle portion is coupled to the first portion, and the second side of the middle portion is coupled to the second portion. The middle portion includes an interaction chamber, a first fluid supply inlet, a second fluid supply inlet, a first outlet nozzle, and a second outlet nozzle. The interaction chamber is defined by a chamber wall extending between the first side and the second side of the middle portion. The chamber wall defines a first inlet port, a second inlet port, a first outlet port, and a second outlet port. The first fluid supply inlet is configured to introduce a first inlet fluid stream through the first inlet port and into the interaction chamber. The second fluid supply inlet is configured to introduce a second inlet fluid stream through the second inlet port and into the interaction chamber. The first outlet nozzle is configured to discharge a first outlet fluid stream from the interaction chamber through the first outlet port and the first outlet nozzle. The second outlet nozzle is configured to discharge a second outlet fluid stream from the interaction chamber through the second outlet port and the second outlet nozzle. The first inlet fluid stream collides with the second inlet fluid stream within the interaction chamber. The collision of the first inlet fluid stream with the second inlet fluid stream causes the first outlet fluid stream to sweep as the first outlet fluid stream is discharged from the first outlet nozzle and causes the second outlet fluid stream to sweep as the second outlet fluid stream is discharged from the second outlet nozzle.

In some implementations, the interaction chamber has a central axis extending perpendicular to the first side and second side of the middle portion, and each of the first inlet port, the second inlet port, the first outlet port, and the second outlet port is circumferentially spaced along the chamber wall at 90° around the central axis.

In some implementations, each of the first inlet port and the second inlet port are defined along the chamber wall between the first outlet port and the second outlet port, and each of the first outlet port and the second outlet port are defined along the chamber wall between the first inlet port and the second inlet port.

In some implementations, the first fluid supply inlet continuously introduces the first inlet fluid stream into the interaction chamber, and the second fluid supply inlet continuously introduces the second inlet fluid stream into the interaction chamber.

In some implementations, the first fluid supply inlet introduces the first inlet fluid stream into the interaction chamber at a constant flow rate, and the second fluid supply inlet introduces the second inlet fluid stream into the interaction chamber at a constant flow rate. In some implementations, the first inlet fluid stream and the second inlet fluid stream have the same flow rate.

In some implementations, the first inlet fluid stream and the second inlet fluid stream comprise a liquid.

In some implementations, the first inlet fluid stream and the second inlet fluid stream comprise a gas.

Various other implementations include a sweeping jet device with multidirectional output. The device includes a first portion, a second portion, and a middle portion having a first side and a second side. The first side of the middle portion is coupled to the first portion, and the second side of the middle portion is coupled to the second portion. The middle portion includes an interaction chamber, at least two fluid supply inlets, and at least two outlet nozzles. The interaction chamber is defined by a chamber wall extending between the first side and the second side of the middle portion. The chamber wall defines at least two inlet ports and at least two outlet ports. Each of the at least two fluid supply inlets is configured to introduce one of at least two inlet fluid streams through a respective one of the at least two inlet ports and into the interaction chamber. Each of the at least two outlet nozzles is configured to discharge one of at least two outlet fluid streams from the interaction chamber through a respective one of the at least two outlet ports and through the outlet nozzle. The at least two inlet fluid streams collide with each other within the interaction chamber. The collision of the at least two inlet fluid streams with each other causes each of the at least two outlet fluid streams to sweep as the at least two outlet fluid streams are discharged from respective outlet nozzles.

In some implementations, the interaction chamber has a central axis extending perpendicular to the first side and second side of the middle portion, and each of the at least two inlet ports and at least two outlet ports is circumferentially spaced along the chamber wall at 360°/N around the central axis. N is the total number of inlet ports and outlet ports. In some implementations, N=6. In some implementations, N=8.

In some implementations, each of the at least two inlet ports is defined along the chamber wall between two adjacent outlet ports, and each of the at least two outlet ports is defined along the chamber wall between two adjacent inlet ports.

In some implementations, each of the at least two fluid supply inlets continuously introduces one of the at least two inlet fluid streams into the interaction chamber.

In some implementations, each of the at least two fluid supply inlets introduces one of the at least two inlet fluid streams into the interaction chamber at a constant flow rate. In some implementations, each of the at least two inlet fluid streams has the same flow rate.

In some implementations, each of the at least two inlet fluid streams comprises a liquid.

In some implementations, each of the at least two inlet fluid streams comprises a gas.

BRIEF DESCRIPTION OF DRAWINGS

Example features and implementations are disclosed in the accompanying drawings. However, the present disclosure is not limited to the precise arrangements and instrumentalities shown. Similar elements in different implementations are designated using the same reference numerals.

DETAILED DESCRIPTION

Figure 1A:
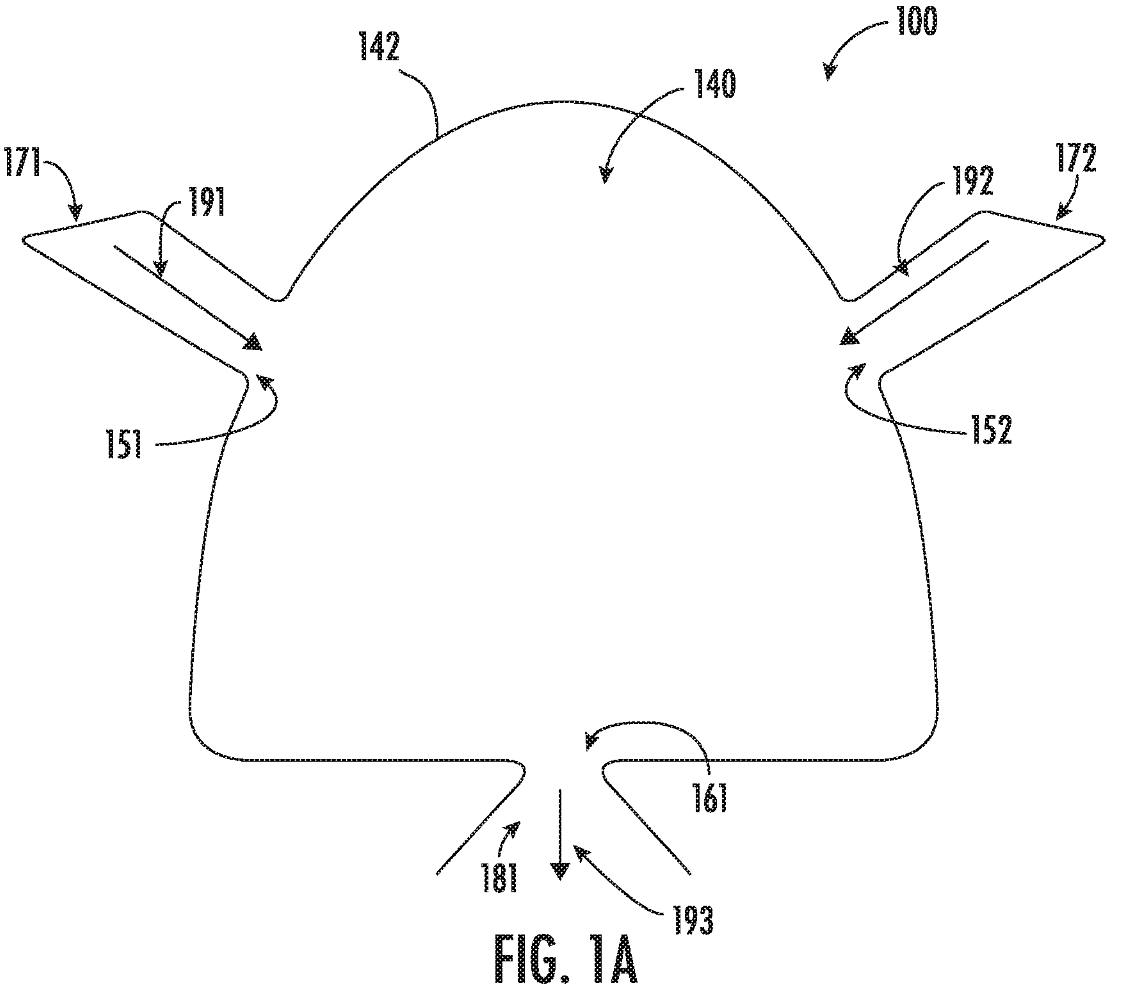
FIG. 1A (PRIOR ART)
FIG. 1A is a top view of a jet interaction-type fluidic oscillator of the prior art.

The devices, systems, and methods disclosed herein provide for a sweeping jet device capable of creating multiple sweeping outputs. The outputs are multidirectional and can provide a 360° output coverage.

Various implementations include a sweeping jet device with multidirectional output. The device includes a first portion, a second portion, and a middle portion having a first side and a second side. The first side of the middle portion is coupled to the first portion, and the second side of the middle portion is coupled to the second portion. The middle portion includes an interaction chamber, a first fluid supply inlet, a second fluid supply inlet, a first outlet nozzle, and a second outlet nozzle. The interaction chamber is defined by a chamber wall extending between the first side and the second side of the middle portion. The chamber wall defines a first inlet port, a second inlet port, a first outlet port, and a second outlet port. The first fluid supply inlet is configured to introduce a first inlet fluid stream through the first inlet port and into the interaction chamber. The second fluid supply inlet is configured to introduce a second inlet fluid stream through the second inlet port and into the interaction chamber. The first outlet nozzle is configured to discharge a first outlet fluid stream from the interaction chamber through the first outlet port and the first outlet nozzle. The second outlet nozzle is configured to discharge a second outlet fluid stream from the interaction chamber through the second outlet port and the second outlet nozzle. The first inlet fluid stream collides with the second inlet fluid stream within the interaction chamber. The collision of the first inlet fluid stream with the second inlet fluid stream causes the first outlet fluid stream to sweep as the first outlet fluid stream is discharged from the first outlet nozzle and causes the second outlet fluid stream to sweep as the second outlet fluid stream is discharged from the second outlet nozzle.

Various other implementations include a sweeping jet device with multidirectional output. The device includes a first portion, a second portion, and a middle portion having a first side and a second side. The first side of the middle portion is coupled to the first portion, and the second side of the middle portion is coupled to the second portion. The middle portion includes an interaction chamber, at least two fluid supply inlets, and at least two outlet nozzles. The interaction chamber is defined by a chamber wall extending between the first side and the second side of the middle portion. The chamber wall defines at least two inlet ports and at least two outlet ports. Each of the at least two fluid supply inlets is configured to introduce one of at least two inlet fluid streams through a respective one of the at least two inlet ports and into the interaction chamber. Each of the at least two outlet nozzles is configured to discharge one of at least two outlet fluid streams from the interaction chamber through a respective one of the at least two outlet ports and through the outlet nozzle. The at least two inlet fluid streams collide with each other within the interaction chamber. The collision of the at least two inlet fluid streams with each other causes each of the at least two outlet fluid streams to sweep as the at least two outlet fluid streams are discharged from respective outlet nozzles.

Figure 1B:
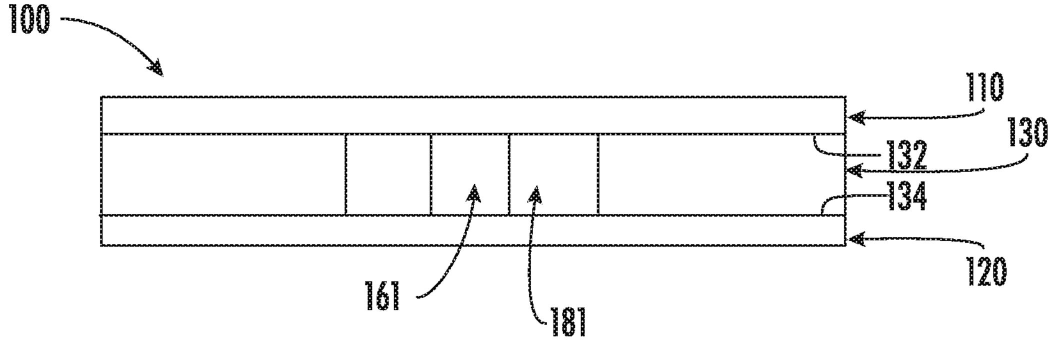
FIG. 1B (PRIOR ART)
FIG. 1B is an end view of the jet interaction-type fluidic oscillator of FIG. 1A.

FIG. 1A shows a top view of a jet interaction-type fluidic oscillator 100 of the prior art, and FIG. 1B shows an end view of the jet interaction-type fluidic oscillator 100 of the prior art as viewed from the outlet nozzle 181 of the middle portion 130. The jet interaction-type fluidic oscillator 100 includes a first portion 110, a second portion 120, and a middle portion 130 disposed between the first portion 110 and the second portion 120. The middle portion 130 includes a first side 132, a second side 134 opposite and spaced apart from the first side 132, and a chamber wall 142 extending from the first side 132 to the second side 134. The chamber wall 142 defines an interaction chamber 140. The chamber wall 142 defines a first inlet port 151, a second inlet port 152, and an outlet port 161. The middle portion 130 of the fluidic oscillator 100 further includes a first fluid supply inlet 171, a second fluid supply inlet 172, and an outlet nozzle 181. The first fluid supply inlet 171 is in fluid communication with the interaction chamber 140 via the first inlet port 151, the second fluid supply inlet 172 is in fluid communication with the interaction chamber 140 via the second inlet port 152, and the outlet nozzle 181 is in fluid communication with the interaction chamber 140 via the outlet port 161.

A first fluid stream 191 enters the interaction chamber 140 of the fluidic oscillator 100 through the first fluid supply inlet 171, through the first inlet port 151, through the interaction chamber 140, and exits the fluidic oscillator 100 through the outlet port 161 and the outlet nozzle 181. Simultaneously, a second fluid stream 192 enters the fluidic oscillator 100 through the second fluid supply inlet 172, through the second inlet port 152, through the interaction chamber 140, and exits the fluidic oscillator 100 through the outlet port 161 and the outlet nozzle 181. The first fluid stream 191 and second fluid stream 192 are angled to collide with each other in the interaction chamber 140. As the first fluid stream 191 and second fluid stream 192 collide in the interaction chamber 140, the fluid stream 193 exiting the interaction chamber 140 through the outlet port 161 and the outlet nozzle 181 oscillates in a plane parallel to the first side 132 of the middle portion 130.

FIG. 2A-D shows a sweeping jet device 200 with multi-directional output according to one implementation of the current application. The device 200 includes a first portion 210, a second portion 220, and a middle portion 230. The first portion 210 has a first side 212 and a second side 214 opposite and spaced apart from the first side 212 of the first portion 210, the second portion 220 has a first side 222 and a second side 224 opposite and spaced apart first side 222 of the first portion 210, and the middle portion 230 has a first side 232 and a second side 234 opposite and spaced apart first side 232 of the middle portion 230. Second side 214 of the first portion 210 is coupled to the first side 232 of the middle portion 230, and the second side 234 of the middle portion 230 is coupled to the first side 222 of the second portion 220.

The middle portion 230 includes a chamber wall 242 that, along with the second side 214 of the first portion 210 and the first side 222 of the second portion 220, define an interaction chamber 240 through which fluid can flow. The chamber wall 242 defines a first inlet port 251, a second inlet port 252, a first outlet port 261, and a second outlet port 262.

The middle portion 230 further includes a first fluid supply inlet 271 and a second fluid supply inlet 272. The first fluid supply inlet 271 is coupled to the first inlet port 251 and is in fluid communication with the interaction chamber 240 through the first inlet port 251. The second fluid supply inlet 272 is coupled to the second inlet port 252 and is in fluid communication with the interaction chamber 240 through the second inlet port 252. The first fluid supply inlet 271 is configured to supply a first inlet fluid stream 291, through the first inlet port 251, and into the interaction chamber 240. The second fluid supply inlet 272 is configured to supply a second inlet fluid stream 292, through the second inlet port 252, and into the interaction chamber 240. The fluid supply inlets 271, 272 and inlet ports 251, 252 are shaped such that the first inlet fluid stream 291 and the second inlet fluid stream 292 collide with each other within the interaction chamber 240.

The first and second fluid supply inlets 271, 272 shown in FIG. 2A-D continuously introduce the first and second inlet fluid streams 291, 292, respectively, into the interaction chamber 240, but in other implementations, one or both of the first and second fluid supply inlets introduce the first and second inlet fluid streams discontinuously to change the sweeping of the first and second outlet fluid streams as they exit the outlet nozzles, as discussed below. The first and second fluid supply inlets 271, 272 shown in FIG. 2A-D introduce the first and second inlet fluid streams 291, 292, respectively, into the interaction chamber 240 at a constant flow rate, but in other implementations, one or both of the first and second fluid supply inlets introduce the first and second inlet fluid streams at varying flow rates to change the sweeping of the first and second outlet fluid streams as they exit the outlet nozzles, as discussed below. The first inlet fluid stream 291 and the second inlet fluid stream 292 shown in FIG. 2A-D have the same flow rate, but in other implementations, the first inlet fluid stream and the second inlet fluid stream have different flow rates.

The middle portion 230 also includes a first outlet nozzle 281 and a second outlet nozzle 282. The first outlet nozzle 281 is coupled to the first outlet port 261 and is in fluid communication with the interaction chamber 240 through the first outlet port 261. The second outlet nozzle 282 is coupled to the second outlet port 262 and is in fluid communication with the interaction chamber 240 through the second outlet port 262. The first outlet nozzle 281 is configured to discharge a first outlet fluid stream 293 comprised of portions of the first and second inlet fluid streams 291, 292 from the interaction chamber 240, through the first outlet port 261, and out of the device 200. The second outlet nozzle 282 is configured to discharge a second outlet fluid stream 294 comprised of portions of the first and second inlet fluid streams 291, 292 from the interaction chamber 240, through the second outlet port 262, and out of the device 200.

Figure 2A:
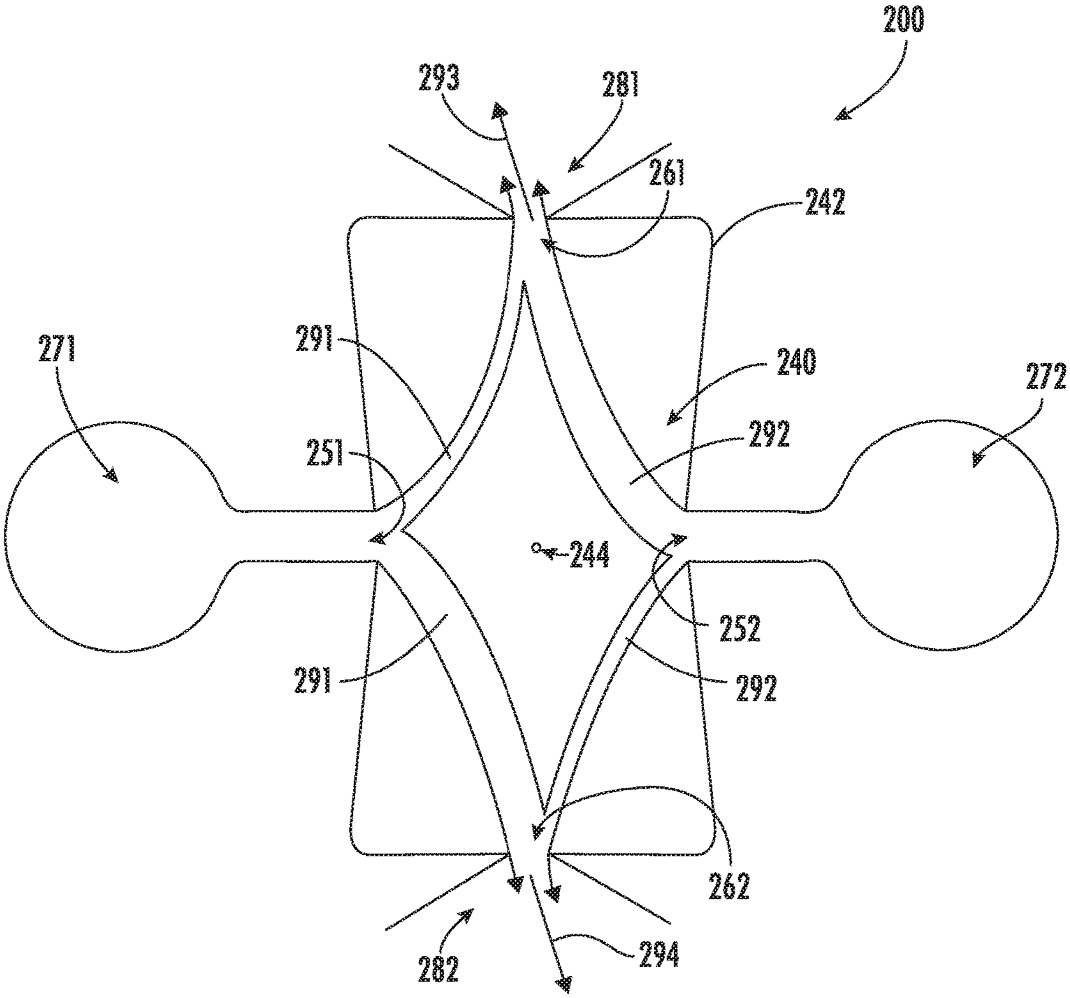
FIG. 2A is a top view of a sweeping jet device with multidirectional output, according to one implementation.
Figure 2B:
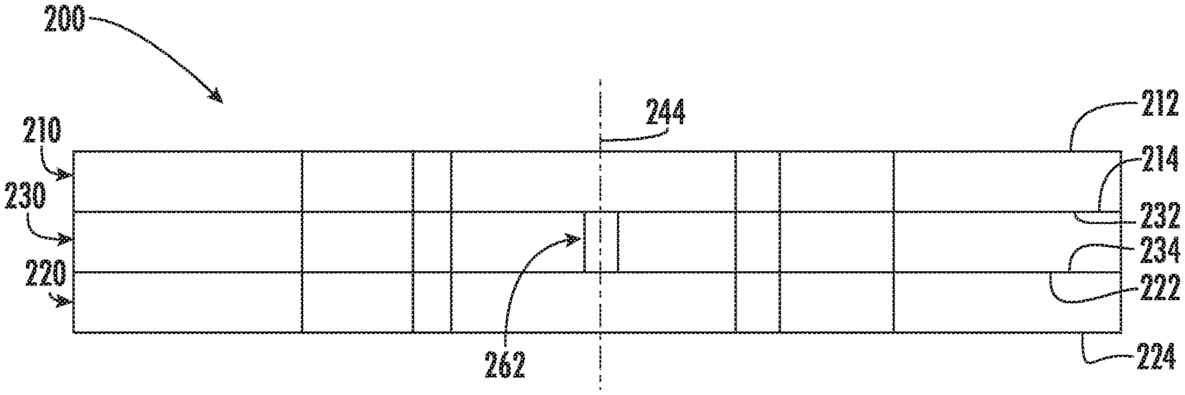
FIG. 2B is an end view of the sweeping jet device of FIG. 2A.
Figure 2C:
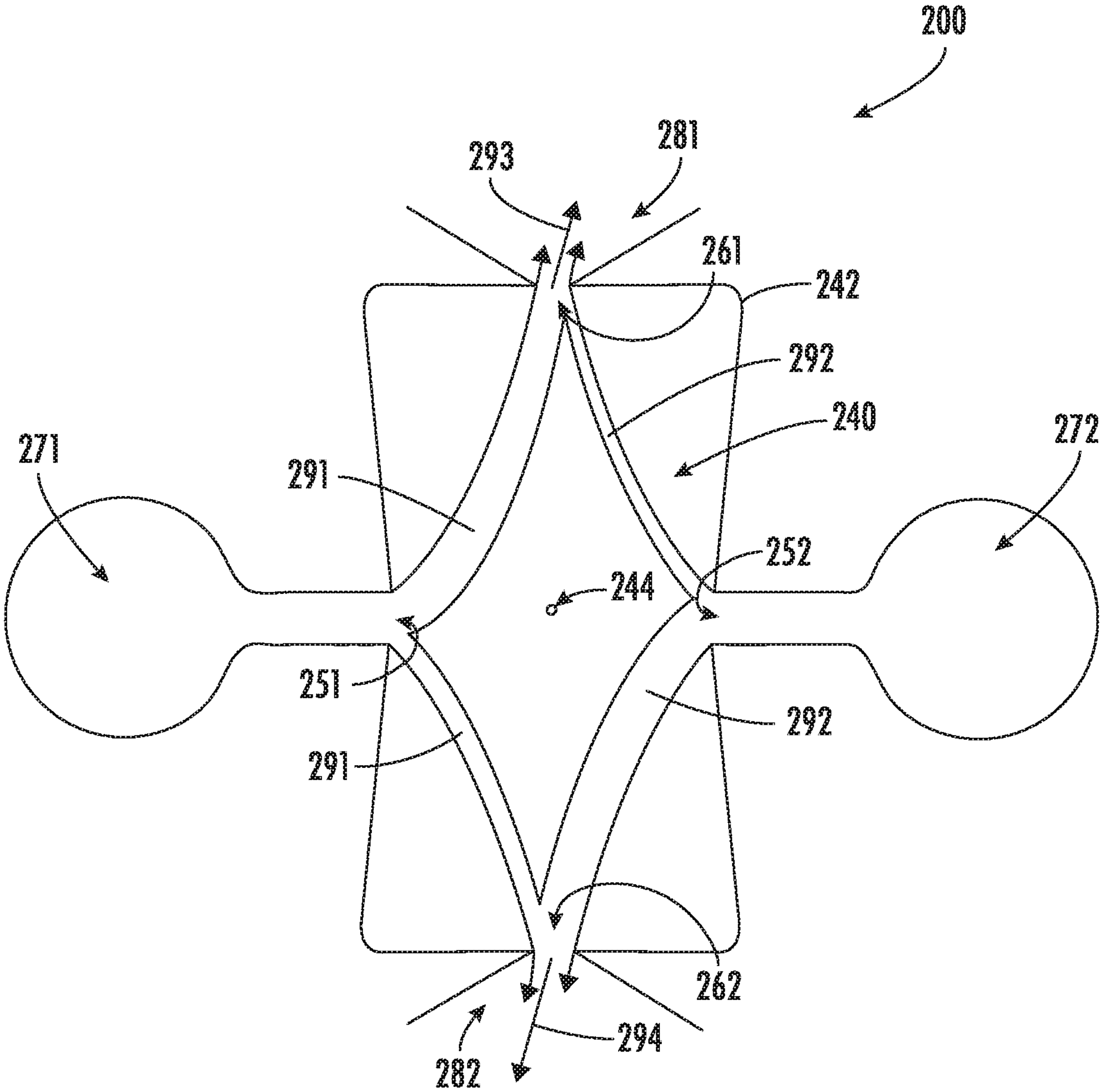
FIG. 2C is a top view of the sweeping jet device of FIG. 2A with the outlet fluid streams swept in the opposite direction.
Figure 2D:
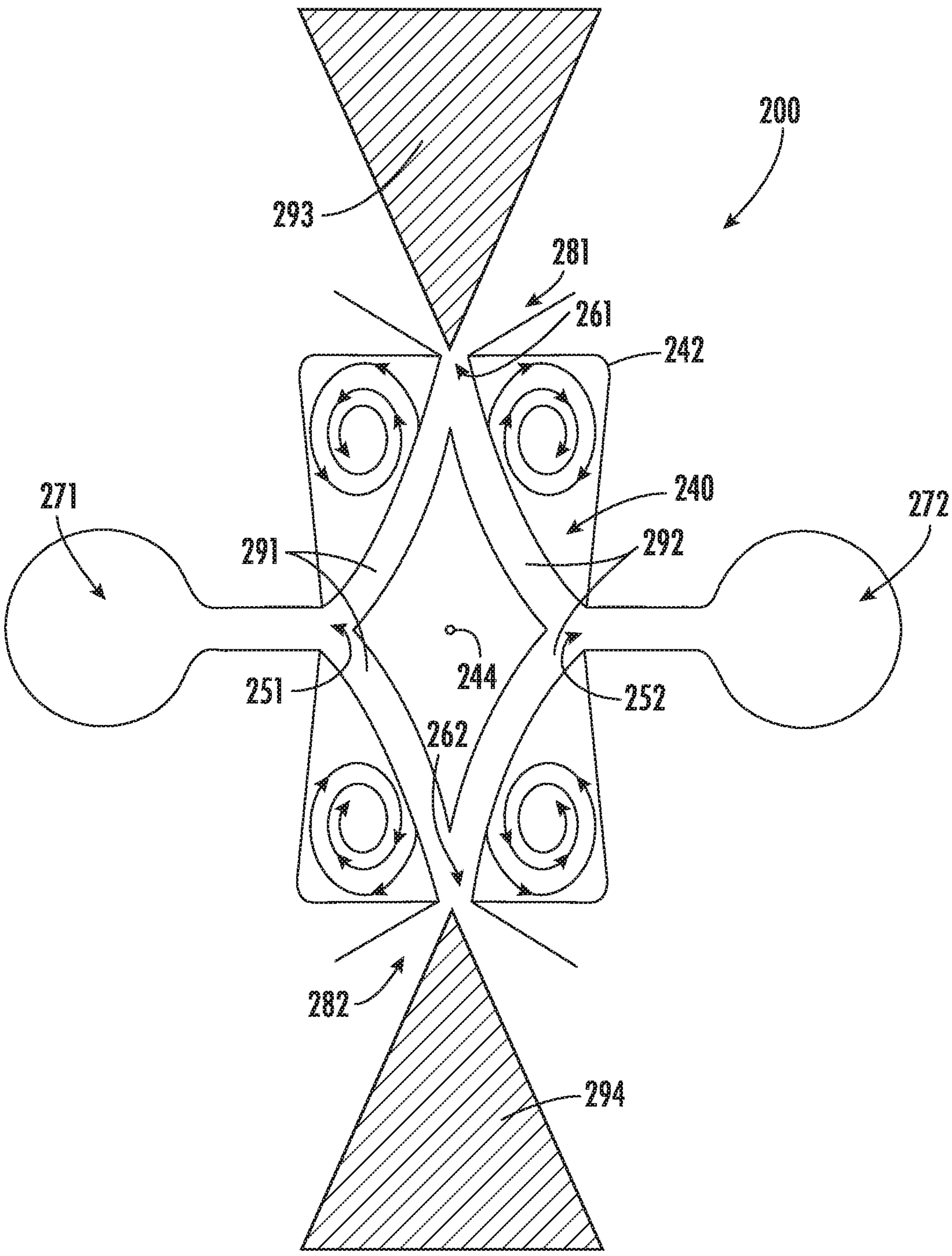
FIG. 2D is a top view of the sweeping jet device of FIG. 2A with a time average of the sweeping outlet fluid streams.

The collision of the inlet fluid streams 291, 292 within the interaction chamber 240 causes each of the inlet fluid streams 291, 292 to bifurcate, as shown in FIGS. 2A, 2C, and 2D. Because of the unsteady nature of the inlet fluid streams 291, 292 as they enter the interaction chamber 240, a varying portion of each inlet fluid stream 291, 292 flows toward each adjacent outlet port 261, 262. In some instances, one portion of an inlet fluid stream 291, 292 may be zero such that the inlet fluid stream 291, 292 may not bifurcate, and the entirety of the inlet fluid stream 291, 292 flows toward one adjacent outlet port 261, 262 and none of the inlet fluid stream 291, 292 flows toward the other adjacent outlet port 261, 262. As the unsteady inlet fluid streams 291, 292 collide in the interaction chamber 240, the flow rate of each portion of each bifurcated inlet fluid stream 291, 292 varies. Each portion of each of the inlet fluid streams 291, 292 flows to an adjacent outlet port 261, 262 and combine to form the fluid outlet stream 293, 294 exiting the outlet port 261, 262 and respective outlet nozzle 281, 282. As seen in FIGS. 2A, 2C, and 2D, a portion of the first inlet fluid stream 291 and a portion of the second inlet fluid stream 292 combine to form the first outlet fluid stream 293, and the other portion of the first inlet fluid stream 291 and the other portion of the second inlet fluid stream 292 combine to form the second outlet fluid stream 294.

When the flow rate of one of the portions of an inlet stream 291, 292 is greater than the flow rate of the portion of the other adjacent inlet stream 291, 292, the portion of the inlet stream 291, 292 with the greater flow rate will cause the resulting outlet stream 261, 262 to exit the outlet nozzle 281, 282 at an angle directed away from the greater flow rate portion and representative of the proportions of the flow rates of the two portions combining to create the outlet fluid stream 293, 294.

For example, the device 200 in FIG. 2A shows that the first outlet fluid stream 293 receives a higher flow rate portion from the second inlet fluid stream 292 than from the first inlet fluid stream 291, and the second outlet fluid stream 294 receives a higher flow rate portion from the first inlet fluid stream 291 than from the second inlet fluid stream 292. However, because the inlet fluid streams 291, 292 are unsteady, the flow rate of each of the bifurcated portions of the inlet fluid streams 291, 292 vary over time, causing the proportions of flow rates creating the outlet fluid stream 293, 294 to vary. FIG. 2C shows the same device 200 as in FIG. 2A, but in FIG. 2C, the unsteady inlet fluid streams 291, 292 have changed such that the first outlet fluid stream 293 now receives a higher flow rate portion from the first inlet fluid stream 291 than from the second inlet fluid stream 292, and the second outlet fluid stream 294 receives a higher flow rate portion from the second inlet fluid stream 292 than from the first inlet fluid stream 291. As seen in a comparison of FIG. 2A and FIG. 2C, the variation in flow rates of the portions of the inlet fluid streams 291, 292 causes the angle of the resulting outlet streams 293, 294 to vary, causing the outlet fluid streams 293, 294 to sweep from side to side over time. FIG. 2D shows a time average of the sweeping outlet fluid streams 293, 294 of the device 200 shown in FIGS. 2A-2C.

The spacing and configuration of the inlet ports 251, 252, fluid supply inlets 271, 272, outlet ports 261, 262, and outlet nozzles 281, 282 can be altered to achieve different sweeping effects. Each of the first inlet port 251 and the second inlet port 252 shown in FIG. 2A-D are defined along the chamber wall 242 between the first outlet port 261 and the second outlet port 262, and each of the first outlet port 261 and the second outlet port 262 are defined along the chamber wall between the first inlet port 251 and the second inlet port 252. The interaction chamber 240 shown in FIG. 2A-D has a central axis 244 extending perpendicular to the first side 232 and second side 234 of the middle portion 230. Each of the first inlet port 251, the second inlet port 252, the first outlet port 261, and the second outlet port 262 is circumferentially spaced along the chamber wall 242 at 90° around the central axis 244. Thus, the first inlet port 251, the second inlet port 252, the first outlet port 261, and the second outlet port 262 of the device 200 shown in FIG. 2A-D are disposed equally spaced along the chamber wall 242. However, in other implementations, the inlet ports and outlet ports are arranged in any order and spacing to achieve a desired sweeping effect.

The first inlet fluid stream 291 and the second inlet fluid stream 292 shown in FIG. 2A-D include a liquid, but in other implementations, the first inlet fluid stream and the second inlet fluid stream are a gas.

Figure 3:
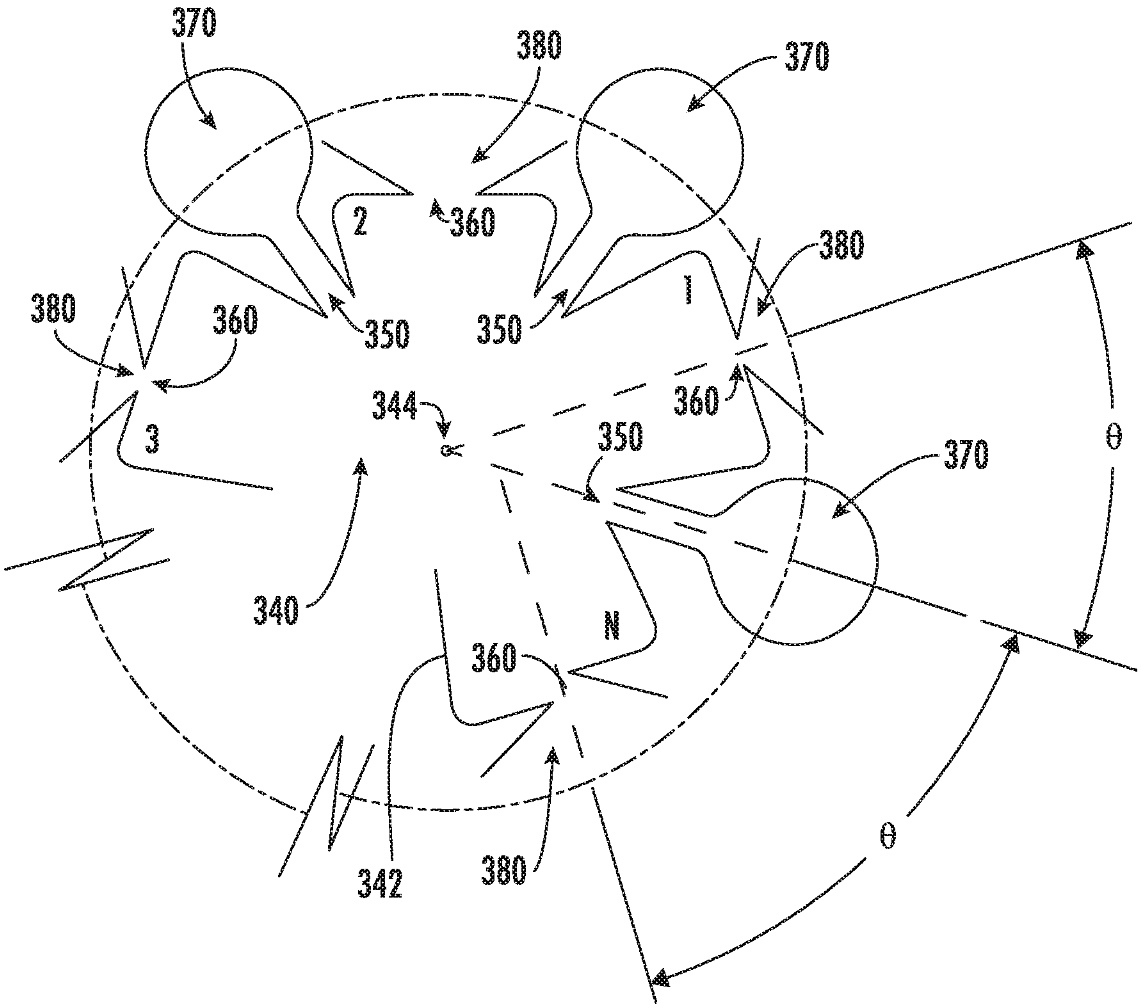
FIG. 3 is a top view of a sweeping jet device with multidirectional output, according to another implementation.
Figure 4:
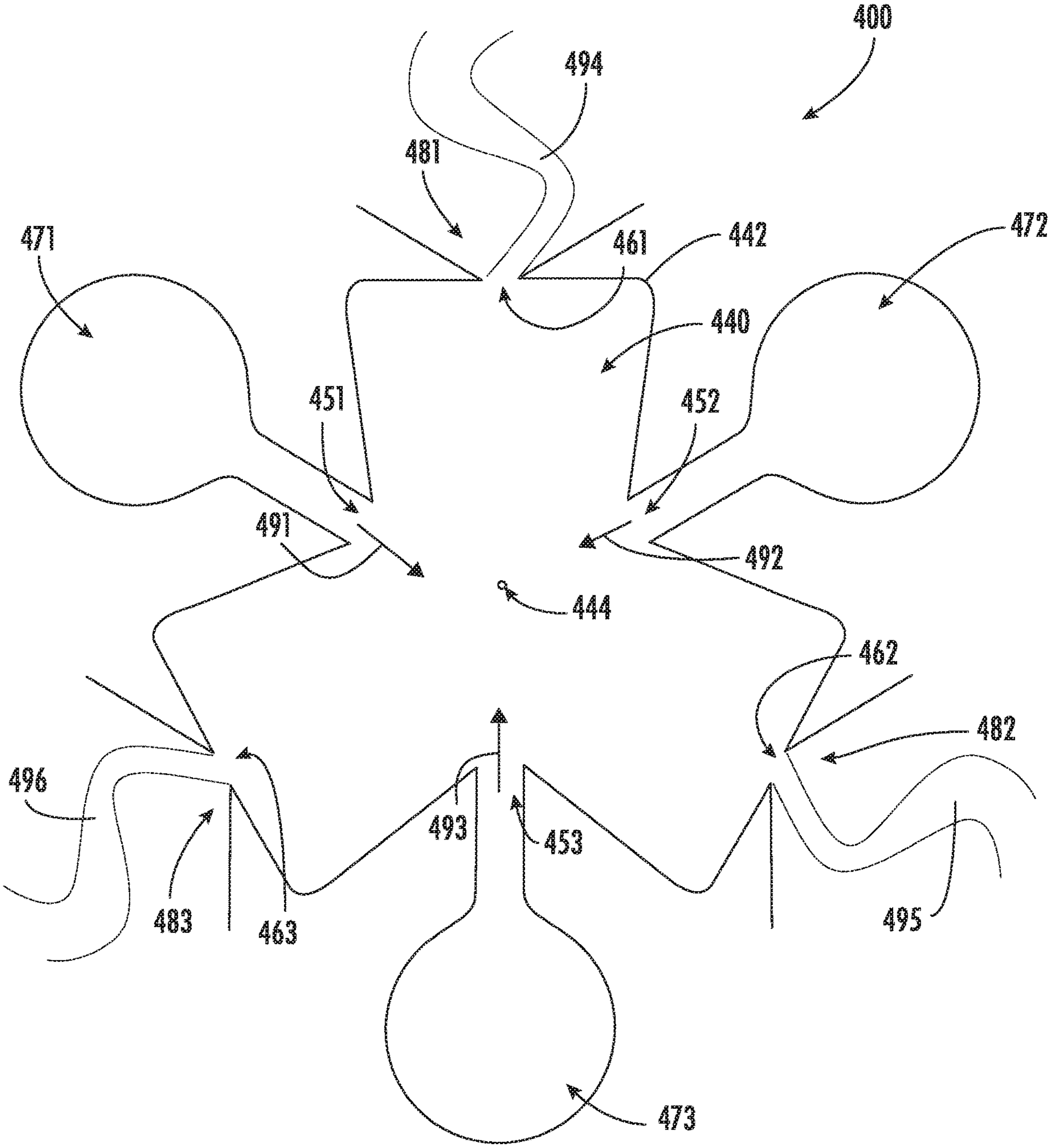
FIG. 4 is a top view of a sweeping jet device with multidirectional output, according to another implementation.
Figure 5:
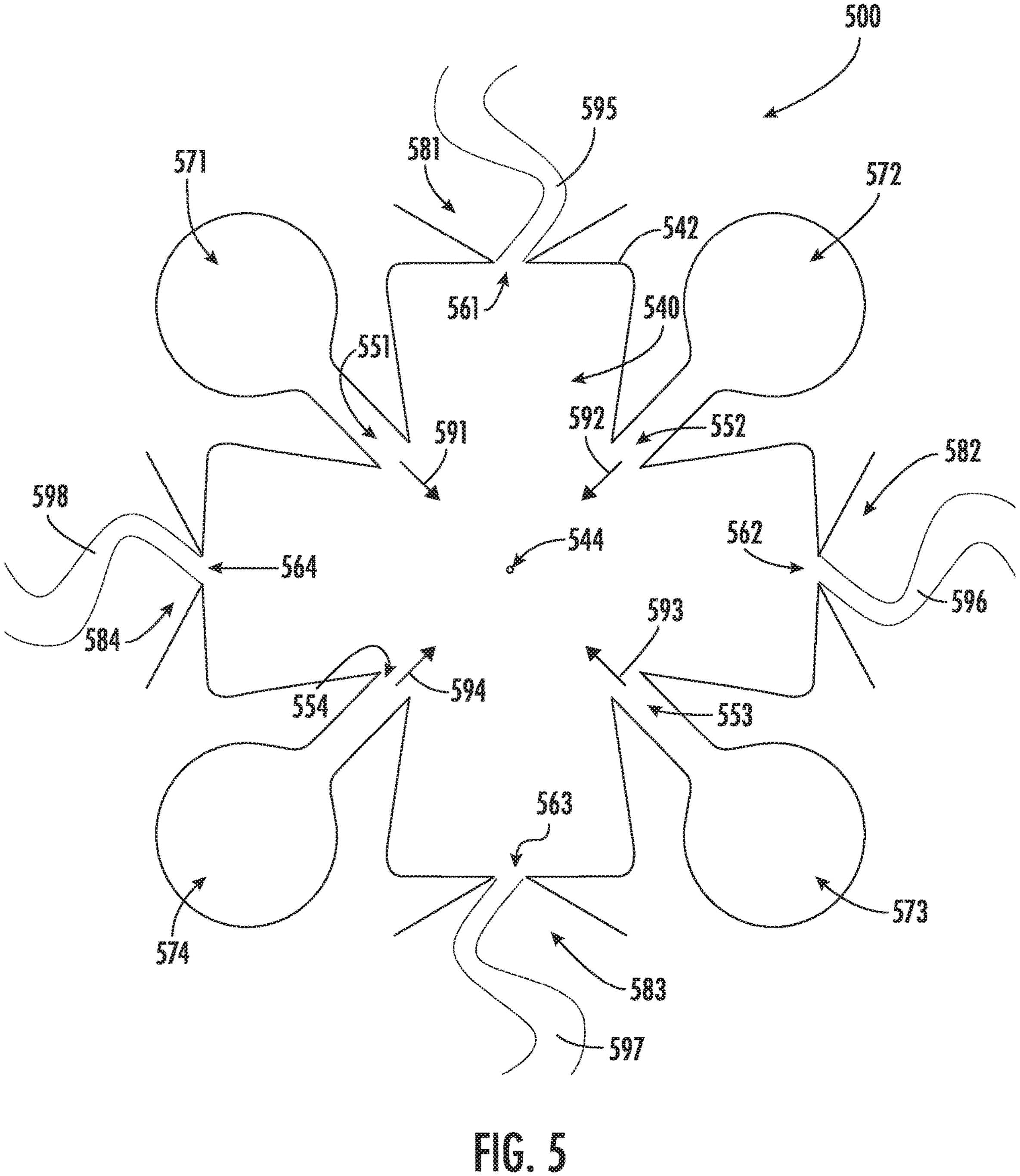
FIG. 5 is a top view of a sweeping jet device with multidirectional output, according to another implementation.

Although the device 200 shown in FIG. 2A-D includes first and second inlet ports 251, 252, first and second outlet ports 261, 262, first and second fluid supply inlets 271, 272, and first and second outlet nozzles 281, 282, in other implementations, the device can include any number of two or more inlet ports, outlet ports, fluid supply inlets, and outlet nozzles. FIG. 3 shows a sweeping jet device 300 having N total inlet ports 350 and outlet ports 360 and N total fluid supply inlets 370 and outlet nozzles 380, wherein N is a number four or more. Similar reference numbers are employed in FIG. 3 for designating similar elements shown in FIG. 2. FIG. 4 shows a sweeping jet device 400 wherein N equals six such that the device 400 has three inlet ports 451, 452, 453, three outlet ports 461, 462, 463, three fluid supply inlets 471, 472, 473, and three outlet nozzles 481, 482, 483. Similar reference numbers are employed in FIG. 4 for designating similar elements shown in FIG. 2. FIG. 5 shows a sweeping jet device 500 wherein N equals eight such that the device 500 has four inlet ports 551, 552, 553, 554, four outlet ports 561, 562, 563, 564, four fluid supply inlets 571, 572, 573, 574, and four outlet nozzles 581, 582, 583, 584. Similar reference numbers are employed in FIG. 5 for designating similar elements shown in FIG. 2. As shown in FIG. 3, the interaction chamber 340 has a central axis 344 extending perpendicular to the first side 332 and second side 334 of the middle portion 330, and each of the at least two inlet ports 350 and at least two outlet ports 360 is circumferentially spaced along the chamber wall 342 at θ=360° N around the central axis 344. However, as stated above, in other implementations, the inlet and outlet ports are spaced and disposed in any order along the chamber wall.

A number of implementations have been described. Nevertheless, it will be understood that various modifications may be made without departing from the spirit and scope of the claims. Accordingly, other implementations are within the scope of the following claims.

Certain terminology is used herein for convenience only and is not to be taken as a limitation on the present claims. In the drawings, the same reference numbers are employed for designating the same elements throughout the several figures. A number of examples are provided, nevertheless, it will be understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

What is claimed is:

1. A sweeping jet device with multidirectional output, the device comprising:
- a first portion, a second portion, and a middle portion having a first side and a second side, the first side of the middle portion being coupled to the first portion and the second side of the middle portion being coupled to the second portion, the middle portion comprising:
  - an interaction chamber defined by a chamber wall extending between the first side and the second side of the middle portion, wherein the chamber wall defines a first inlet port, a second inlet port, a first outlet port, and a second outlet port;
  - a first fluid supply inlet configured to introduce a first inlet fluid stream through the first inlet port and into the interaction chamber;
  - a second fluid supply inlet configured to introduce a second inlet fluid stream through the second inlet port and into the interaction chamber;
  - a first outlet nozzle configured to discharge a first outlet fluid stream from the interaction chamber through the first outlet port and the first outlet nozzle; and
  - a second outlet nozzle configured to discharge a second outlet fluid stream from the interaction chamber through the second outlet port and the second outlet nozzle,
  - wherein the first inlet fluid stream collides with the second inlet fluid stream within the interaction chamber,
  - wherein the collision of the first inlet fluid stream with the second inlet fluid stream causes the first outlet fluid stream to sweep as the first outlet fluid stream is discharged from the first outlet nozzle and causes the second outlet fluid stream to sweep as the second outlet fluid stream is discharged from the second outlet nozzle, and
  - wherein the first outlet port and the second outlet port are defined by the chamber wall to face in different directions from each other, creating a multidirectional output.

2. The device of claim 1, wherein the interaction chamber has a central axis extending perpendicular to the first side and second side of the middle portion, and each of the first inlet port, the second inlet port, the first outlet port, and the second outlet port is circumferentially spaced along the chamber wall at 90° around the central axis.

3. The device of claim 1, wherein each of the first inlet port and the second inlet port are defined along the chamber wall between the first outlet port and the second outlet port, and each of the first outlet port and the second outlet port are defined along the chamber wall between the first inlet port and the second inlet port.

4. The device of claim 1, wherein the first fluid supply inlet continuously introduces the first inlet fluid stream into the interaction chamber and the second fluid supply inlet continuously introduces the second inlet fluid stream into the interaction chamber.

5. The device of claim 1, wherein the first fluid supply inlet introduces the first inlet fluid stream into the interaction chamber at a constant flow rate and the second fluid supply inlet introduces the second inlet fluid stream into the interaction chamber at a constant flow rate.

6. The device of claim 5, wherein the first inlet fluid stream and the second inlet fluid stream have the same flow rate.

7. The device of claim 1, wherein the first inlet fluid stream and the second inlet fluid stream comprise a liquid.

8. The device of claim 1, wherein the first inlet fluid stream and the second inlet fluid stream comprise a gas.

9. A sweeping jet device with multidirectional output, the device comprising:

- a first portion, a second portion, and a middle portion having a first side and a second side, the first side of the middle portion being coupled to the first portion and the second side of the middle portion being coupled to the second portion, the middle portion comprising:
  - an interaction chamber defined by a chamber wall extending between the first side and the second side of the middle portion, wherein the chamber wall defines at least two inlet ports and at least two outlet ports;
  - at least two fluid supply inlets, each of the at least two fluid supply inlets configured to introduce one of at least two inlet fluid streams through a respective one of the at least two inlet ports and into the interaction chamber; and
  - at least two outlet nozzles, each of the at least two outlet nozzles configured to discharge one of at least two outlet fluid streams from the interaction chamber through a respective one of the at least two outlet ports and through the outlet nozzle;
- wherein the at least two inlet fluid streams collide with each other within the interaction chamber,
- wherein the collision of the at least two inlet fluid streams with each other causes each of the at least two outlet fluid streams to sweep as the at least two outlet fluid streams are discharged from respective outlet nozzles, and
- wherein the at least two outlet ports are defined by the chamber wall to face in different directions from each other, creating the multidirectional output.

10. The device of claim 9, wherein the interaction chamber has a central axis extending perpendicular to the first side and second side of the middle portion, and each of the at least two inlet ports and at least two outlet ports is circumferentially spaced along the chamber wall at 360°/N around the central axis, wherein N is the total number of inlet ports and outlet ports.

11. The device of claim 10, wherein N=6.

12. The device of claim 10, wherein N=8.

13. The device of claim 9, wherein each of the at least two inlet ports is defined along the chamber wall between two adjacent outlet ports, and each of the at least two outlet ports is defined along the chamber wall between two adjacent inlet ports.

14. The device of claim 9, wherein each of the at least two fluid supply inlets continuously introduces one of the at least two inlet fluid streams into the interaction chamber.

15. The device of claim 9, wherein each of the at least two fluid supply inlets introduces one of the at least two inlet fluid streams into the interaction chamber at a constant flow rate.

16. The device of claim 15, wherein each of the at least two inlet fluid streams has the same flow rate.

17. The device of claim 9, wherein each of the at least two inlet fluid streams comprises a liquid.

18. The device of claim 9, wherein each of the at least two inlet fluid streams comprises a gas.

19. The device of claim 1, wherein one or both of the first and second fluid supply inlets introduce the first and second fluid streams discontinuously to change the sweeping of the first and second outlet fluid streams as they exit the outlet nozzles.

20. The device of claim 9, wherein one or both of the at least two fluid supply inlets introduce the at least two inlet fluid streams discontinuously to change the sweeping of the at least two outlet fluid streams as they exit the at least two outlet nozzles.

* * * * *